(12) United States Patent
Huang et al.

(10) Patent No.: US 9,519,384 B2
(45) Date of Patent: Dec. 13, 2016

(54) CONTROL SYSTEM AND METHOD FOR CAPACITIVE TOUCH SCREEN

(71) Applicants: Chien-Ying Huang, Hsinchu (TW); Hsin-Mao Huang, Hsinchu (TW)

(72) Inventors: Chien-Ying Huang, Hsinchu (TW); Hsin-Mao Huang, Hsinchu (TW)

(73) Assignee: FocalTech Systems Co., Ltd., Hsinchu (TW)

( * ) Notice: Subject to any disclaimer, the term of this patent is extended or adjusted under 35 U.S.C. 154(b) by 422 days.

(21) Appl. No.: 13/748,607

(22) Filed: Jan. 24, 2013

(65) Prior Publication Data

US 2013/0234981 A1 Sep. 12, 2013

(30) Foreign Application Priority Data

Mar. 6, 2012 (TW) .............................. 101107500 A (51) Int. Cl.
*G06F 3/045* (2006.01)
*G06F 3/044* (2006.01)
*G06F 3/041* (2006.01)

(52) U.S. Cl.
CPC ............. *G06F 3/044* (2013.01); *G06F 3/0416* (2013.01)

(58) Field of Classification Search
CPC ............................... G06F 3/0416; G06F 3/044
USPC .................................................. 345/173, 174
See application file for complete search history.

(56) References Cited

U.S. PATENT DOCUMENTS

| | | | |
|---|---|---|---|
| 6,292,201 B1* | 9/2001 | Chen et al. .................... | 345/519 |
| 7,617,368 B2* | 11/2009 | Van Dyke et al. ............ | 711/156 |
| 8,753,203 B1* | 6/2014 | Morgan et al. ................. | 463/31 |
| 2002/0021289 A1* | 2/2002 | Combs et al. ................. | 345/173 |
| 2005/0244147 A1* | 11/2005 | Yamagata et al. ............. | 386/125 |
| 2008/0162751 A1* | 7/2008 | Wilson ............................ | 710/52 |
| 2010/0194707 A1* | 8/2010 | Hotelling .............. | G06F 3/0412 |
| | | | 345/173 |
| 2010/0207905 A1* | 8/2010 | Chang et al. .................. | 345/174 |
| 2011/0227865 A1* | 9/2011 | Baek ............................. | 345/174 |
| 2011/0242050 A1* | 10/2011 | Byun et al. .................... | 345/174 |
| 2012/0268416 A1* | 10/2012 | Pirogov .................. | G06F 3/044 |
| | | | 345/174 |

FOREIGN PATENT DOCUMENTS

CN 102103429 6/2011

* cited by examiner

*Primary Examiner* — Kwang-Su Yang
(74) *Attorney, Agent, or Firm* — Jianq Chyun IP Office (57) ABSTRACT

A control system for a capacitive touch screen is provided. The control system comprises a touch detecting circuit, touch hard instruction, a storage module and a controller. The touch detecting circuit detects a capacitance variance to generate touch data. The touch hard instruction executes a touch computing function on the touch data. The storage module is connected to the touch detecting circuit and the at least one touch hard instruction, and records the touch data generated by the touch detecting circuit and the touch data computed by the touch hard instruction. The controller is connected to the touch detecting circuit, the at least one touch hard instruction, and the storage module, and assigns at least one touch task of a touch algorithm to the at least one touch hard instruction, so as to execute a corresponding touch computing function of the touch algorithm.

19 Claims, 5 Drawing Sheets

CONTROL SYSTEM AND METHOD FOR CAPACITIVE TOUCH SCREEN

CROSS-REFERENCE TO RELATED APPLICATION

This application claims the priority benefit of Taiwan application serial no. 101107500, filed on Mar. 6, 2012. The entirety of the above-mentioned patent application is hereby incorporated by reference herein and made a part of this specification.

BACKGROUND

Technical Field

The invention relates to a touch control system and method, and more particularly, the invention relates to a control system and method for a capacitive touch screen.

Related Art

The principle behind capacitive touch screen sensing is applying a voltage to the touch sensing area and forming a uniform electric field, so that when the human body, such as a finger, touches the screen, the resulting capacitance variance induces a current after the transparent electrodes in the touch sensing area conduct in accordance with the weak current in the human body. By detecting the induced current with a touch screen controller, the touch coordinates can be calculated.

Currently, the touch coordinate feedback task of the touch screen controller can be implemented in a plurality of methods. One of the methods employs the touch analog front-end circuit to detect the capacitance variance of the capacitive touch screen, and uses the microcontroller (MCU) to compute the coordinates of the touch location. Computation of the touch coordinates by the MCU can be flexible since it allows for modifications to the computation method of the touch location by updating the firmware. However, this method places a high demand on the computational capability of the MCU, consumes more power, and the cost of the MCU configuration is relatively high.

Another method is complementing the touch analog front-end circuit with an exclusive hardware design for computing the touch coordinates. This method can increase the report rate and lower the power consumption. However, this method lacks flexibility since the touch computation equations used in the method are fixed, or the data flow in the computation are fixed.

SUMMARY

Accordingly, the invention provides a control system and method for a capacitive touch screen, in which a microcontroller is used to distribute the touch tasks to the touch hard instructions in order to execute a plurality of touch computing functions, thereby overcoming the fixedness of data flow.

The invention provides a control system of a capacitive touch screen, including a touch detecting circuit, at least one touch hard instruction, a storage module, and a controller. The touch detecting circuit detects a capacitance variance of a capacitive touch screen to generate a touch data. The touch hard instructions respectively executes a corresponding computing function on the touch data. The storage module is connected to the touch detecting circuit and the touch hard instructions, and the storage module records the touch data generated by the touch detecting circuit and the touch data computed by the touch hard instructions, in which the storage module is divided into a plurality of banks using a touch frame as a unit, so as to respectively record the touch data of the touch frame. The controller is connected to the touch detecting circuit, the touch hard instructions, and the storage module, and the controller assigns at least one touch task of a touch algorithm to the touch hard instructions, so as to execute a corresponding touch computing function of the touch algorithm.

The invention provides a control method for a capacitive touch screen, adapted for a controller controlling the touch hard instructions to execute at least one touch computing function on the touch data of the capacitive touch screen. The method sequentially assigns at least one touch task in a touch algorithm to at least one touch hard instruction, then transmits a computing command to each of the touch hard instructions for calling the touch hard instructions to execute the assigned touch computing function. A flag in each of the touch hard instructions is checked to verify whether the touch hard instruction has completed the touch computing function.

According to an embodiment of the invention, the step of transmitting the computing command to each of the touch hard instructions for calling the touch hard instructions to execute the assigned touch computing function includes transmitting a clean command to a clean instruction for controlling the clean instruction to clean the touch data in the banks of the storage module.

According to an embodiment of the invention, the step of transmitting the computing command to each of the touch hard instructions for calling the touch hard instructions to execute the assigned touch computing function includes transmitting a scan command to a scan instruction for controlling the scan instruction to generate a sensing interface to receive the touch data of the touch capacitive screen, and to generate a memory access interface to fill the touch data of different touch frames into the banks of the storage module.

According to an embodiment of the invention, the step of transmitting the computing command to each of the touch hard instructions for calling the touch hard instructions to execute the assigned touch computing function includes transmitting a multiply command to a multiplier instruction for controlling the multiplier instruction to access the touch data in the banks of the storage module, execute a multiply operation on the touch data, and record the touch data after the multiply operation in the banks of the storage module.

According to an embodiment of the invention, the step of transmitting the computing command to each of the touch hard instructions for calling the touch hard instructions to execute the assigned touch computing function includes transmitting a digital filter command to a digital filter instruction for controlling the digital filter instruction to access the touch data in the banks of the storage module, execute a digital filtering operation on the touch data, and record the touch data after the digital filtering operation in the banks.

According to an embodiment of the invention, the step of transmitting the computing command to each of the touch hard instructions for calling the touch hard instructions to execute the assigned touch computing function includes transmitting an adder command to an adder instruction for controlling the adder instruction to access the touch data in at least two banks of the storage module, execute an adder operation on the touch data, and record the touch data after the adder operation in another bank of the storage module.

According to an embodiment of the invention, the step of transmitting the computing command to each of the touch hard instructions for calling the touch hard instructions to execute the assigned touch computing function includes transmitting a max/min detecting command to a max/min detecting instruction for controlling the max/min detecting instruction to access the touch data in at least two banks of the storage module, detect a plurality of maxima/minima in the touch data, and record the maxima/minima in another bank of the storage module.

In summary, in the control system and method for the capacitive touch screen according to embodiments of the invention, a plurality of touch hard instructions corresponding to different touch computing functions are configured outside of the microcontroller. By using the microcontroller to assign the touch tasks and integrate the computed results of each touch hard instruction, the touch location can be detected, and the static data flow is alleviated.

Several exemplary embodiments accompanied with figures are described in detail below to further describe the disclosure in details.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

In a capacitive touch screen according to embodiments of the invention, a plurality of independent touch hard instructions are designed for the touch detection of the capacitive touch screen, so as to respectively execute different touch computation functions in a touch algorithm. A controller is employed to sequentially assign touch tasks to different touch hard instructions, thereby controlling the access and computation of the touch hard instructions, the updating of the touch data in the memory, and the detection of the touch coordinates. The touch hard instructions according to the embodiments are provided for the controller to call, such that the flexibility for changing the data flow is maintained, and the fixedness of data flow is overcome.

Figure 1:
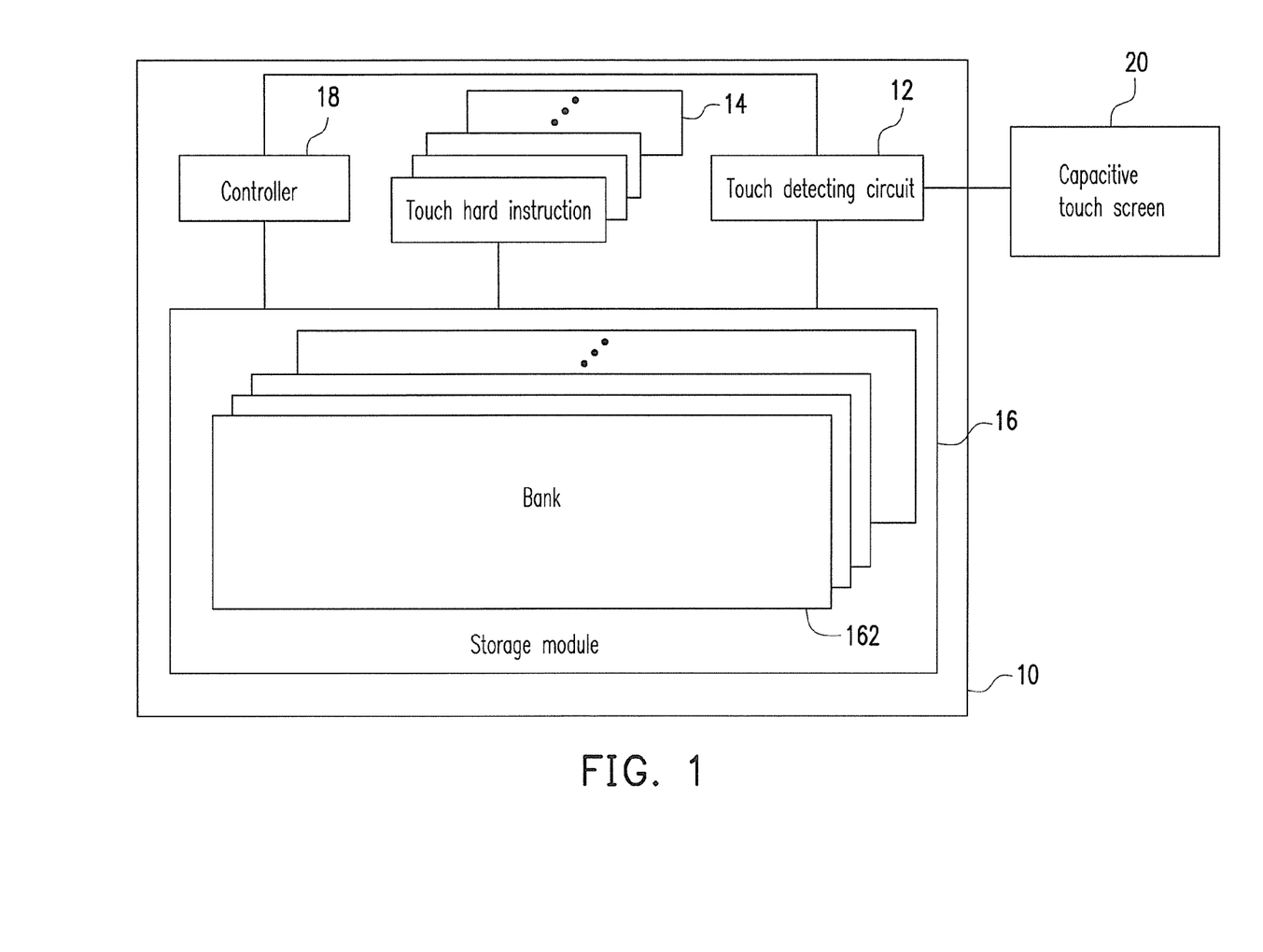
FIG. 1 is a block diagram illustrating a control system for a capacitive touch screen according to an embodiment of the invention.

FIG. 1 is a block diagram illustrating a control system of a capacitive touch screen according to an embodiment of the invention. With reference to FIG. 1, a control system 10 of the present embodiment includes a touch detecting circuit 12, at least one touch hard instruction 14, a storage module 16, and a controller 18.

The touch detecting circuit 12 is, for example, a touch analog front-end circuit connected to a capacitive touch screen 20, in which the touch detecting circuit 12 detects a capacitance variance in a touch sensing area of the capacitive touch screen 20 to generate a touch data. The touch detecting circuit 12 further includes an analog-to-digital converter (ADC) capable of converting a detected analog voltage signal to a digital touch value to serve as the touch data.

The touch hard instructions 14 are designed with hardware such as logic circuits, which may be integrated circuits executing different touch computing functions. The touch hard instructions 14 help the controller 18 to compute the touch coordinates, thereby reducing the power consumption of the controller 18. The touch hard instructions 14 may be divided according to function into a scan instruction, a clean instruction, a multiplier instruction, a digital filter instruction, an adder instruction, and a max/min detecting instruction, for example. Detailed description of these functions and the control method are provided later in the disclosure.

The storage module 16 may be any fixed or removable random access memory (RAM), read-only memory (ROM), flash memory, hard drive, other similar devices, or a combination of the these devices. In the present embodiment, a static random access memory (SRAM) is used for the storage module 16 as an example, and the SRAM may be respectively connected to the touch detecting circuit 12 and the touch hard instructions 14.

It should be mentioned that, the storage module 16 is divided into a plurality of banks 162 using a touch frame as a unit, for example. When the touch hard instructions 14 are executing the touch computing function, the touch frame is also used as a unit for accessing the touch data in the banks and to perform the computation. Moreover, the computation results are stored back into the banks by using the touch frame as a unit. Using the touch frame as the unit for access and computation, the touch hard instructions 14 can carry out a large quantity of touch data computations.

The controller 18 is a microcontroller (MCU), for example, respectively connected to the touch detecting circuit 12, the touch hard instructions 14, and the storage module 16. The controller 18 assigns at least one touch task in the touch algorithm to the touch hard instructions 14, so as to execute a corresponding touch computing function of the touch algorithm. The controller 18 calls the touch hard instructions 14 to execute the touch computing function, for example, and verifies whether the touch computation has been completed according to a response from the touch hard instructions 14.

Figure 2:
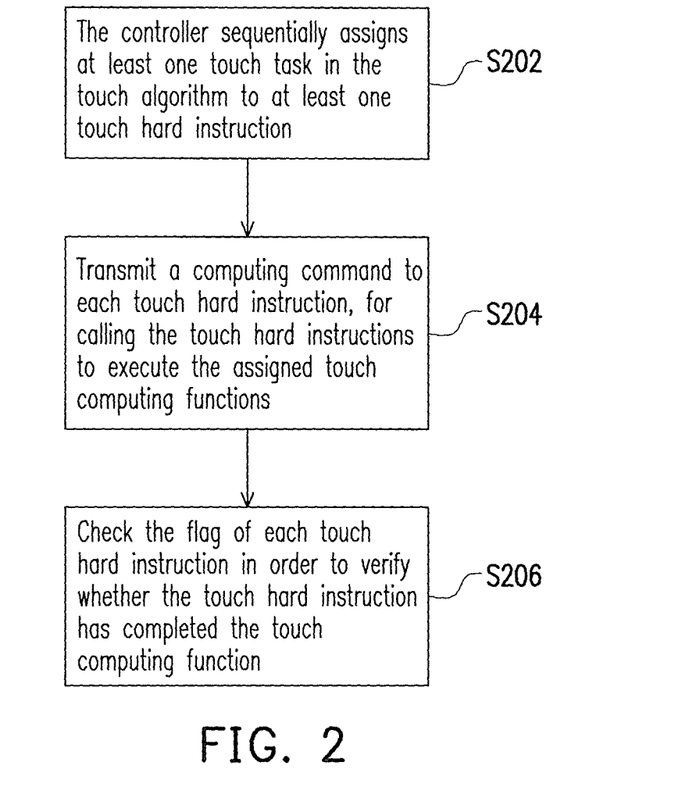
FIG. 2 is a flow diagram of a control method for a capacitive touch screen according to an embodiment of the invention.

To be specific, FIG. 2 is a flow diagram of a control method of a capacitive touch screen according to an embodiment of the invention. With reference to FIGS. 1 and 2, a control method of the present embodiment is adapted for the control system 10 depicted in FIG. 1. Detailed description of the steps in the control method of the present embodiment is provided hereafter with reference to the elements in the control system 10.

In the control method, the controller 18 sequentially assigns at least one touch task in the touch algorithm to the touch hard instructions 14 (Step S202). Moreover, a computing command is transmitted to each of the touch hard instructions 14 according to an assign sequence, for calling the touch hard instructions 14 to execute the assigned touch computing functions (Step S204). The touch computing functions include scan, clean, multiply, digital filtering, adding, or max/min detecting functions, although the invention is not limited thereto.

The controller 18 then checks the flags of the called touch hard instructions 14 in order to verify that the touch hard instructions 14 have completed the assigned touch computing functions (Step S206). To be specific, in the present embodiment, after the touch hard instructions 14 completed the touch computing functions assigned by the controller 18, a flag is sent out to be recorded internally or in an external register. By checking the register, the controller 18 can verify whether the touch hard instructions have completed the assigned touch computing functions. In another embodiment, after the touch hard instructions have completed the touch computing functions assigned by the controller 18, a controller interrupt may be used to notify the controller 18 the touch hard instructions have completed the assigned touch computing functions.

Moreover, after the touch hard instructions 14 received the computing commands, a memory access interface is generated. For example, in order to access the touch data recorded in the banks 162 of the storage module 16, execute the corresponding touch computing function on the touch data, and then write the processed touch data back to the original bank 162 or other banks 162.

Figure 3:
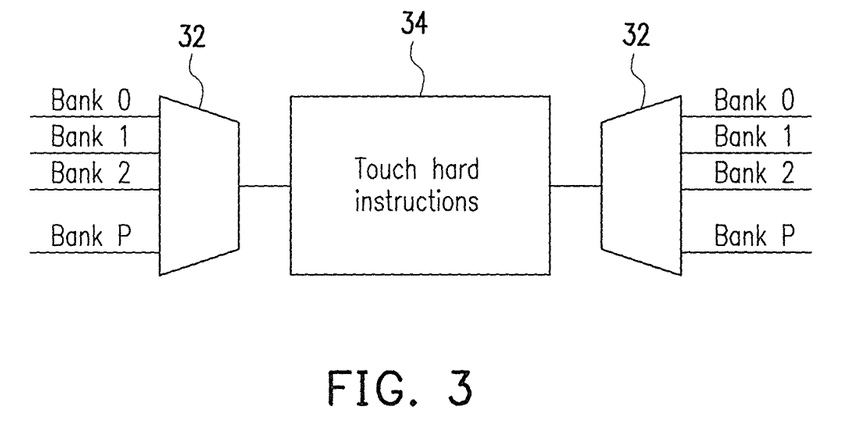
FIG. 3 illustrates an example illustrating the bank access by the touch hard instructions according to an embodiment of the invention.

FIG. 3 illustrates an example of the bank access by the touch hard instructions according to an embodiment of the invention. With reference to FIG. 3, since the banks are formed by dividing the memory using the touch frame as a unit, therefore, when the touch hard instructions execute the touch computing functions, the computing functions are executed using the touch frame as a unit as well. For example, after receiving the computing commands, a memory access interface 32 is automatically generated in order to access the touch data recorded in bank 0~bank P. After computation by the touch hard instructions 34, the processed touch data is written back to bank 0~bank P through the memory access interface 32, thereby completing the touch computing function. Moreover, when the touch hard instructions write the touch data back into the banks, the touch data may be written in the originally accessed bank or the other banks in accordance with an actual requirement, and is not limited in the invention.

It should be noted that, to process the touch computing functions in the touch algorithm, some embodiments of the invention provide different touch hard instructions for call by the controller, so as to help the controller execute the touch computing functions. Accordingly, the computational load of the controller is shared, and the power consumption of the controller is reduced. Another embodiment is illustrated in the following.

Figure 4:
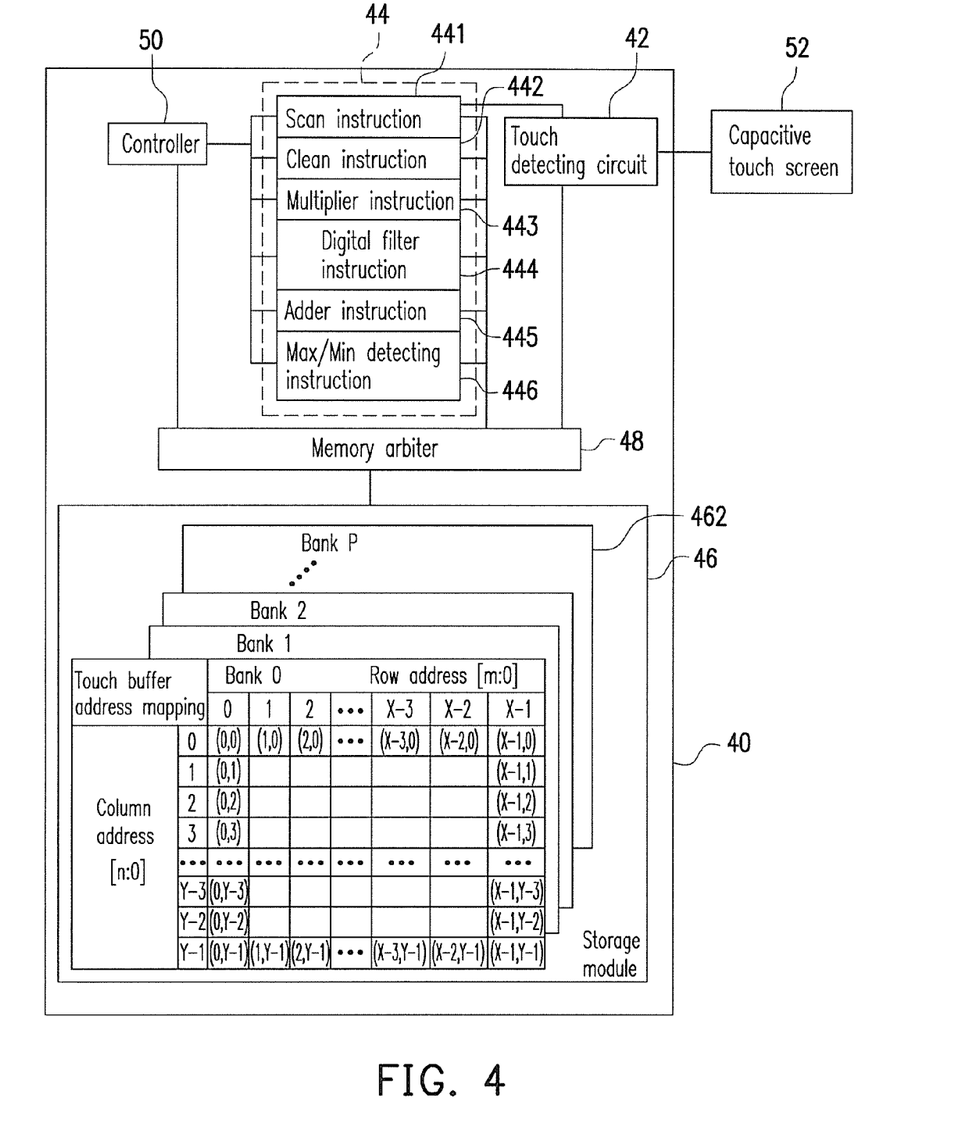
FIG. 4 is a block diagram illustrating a control system for a capacitive touch screen according to an embodiment of the invention.

FIG. 4 is a block diagram illustrating a control system of a capacitive touch screen according to an embodiment of the invention. With reference to FIG. 4, a control system 40 of the present embodiment includes a touch detecting circuit 42, touch hard instructions 44, a storage module 46, a memory arbiter 48, and a controller 50. The touch hard instructions 44 include a scan instruction 441, a clean instruction 442, a multiplier instruction 443, a digital filter instruction 444, an adder instruction 445, and a max/min detecting instruction 446, which can be called by the controller 50 to execute different touch computing functions. The storage module 46 is formed by a plurality of banks 462. Each bank 462 has a different touch buffer address, but the address mapping on the x-axis and the y-axis of each bank 462 is the same. There are at least two advantages with this method of recording the touch data. A programmer can issue a command to access the storage module 46 through the controller 50, and the design of the memory access interface generated by the touch hard instructions 44 can be simplified. It should be mentioned that, since a single-port static random access memory (SRAM) is adopted as the storage module 46 of the present embodiment, the memory arbiter 48 is needed as an agent to provide access to the storage module 46 for a plurality of devices, such as the touch detecting circuit 42, the touch hard instructions 44, and the controller 50.

Figure 5:
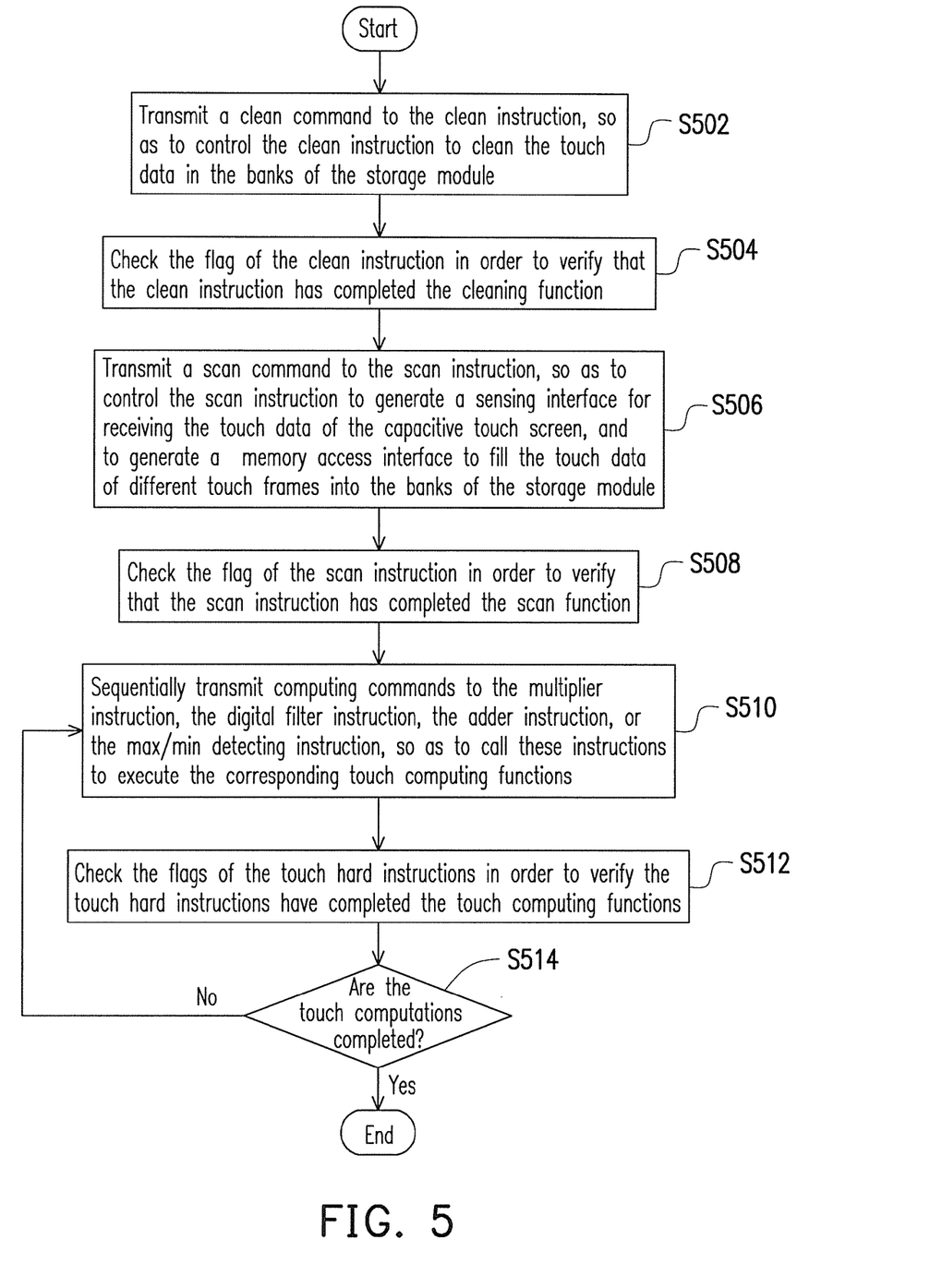
FIG. 5 is a flowchart of a control method for a capacitive touch screen according to an embodiment of the invention.

FIG. 5 is a flowchart of a control method of a capacitive touch screen according to an embodiment of the invention. With reference to FIGS. 4 and 5, a control method of the present embodiment is adapted for the control system 40 depicted in FIG. 4. Detailed description of the steps in the control method of the present embodiment is provided hereafter with reference to the elements in the control system 40.

Figure 6:
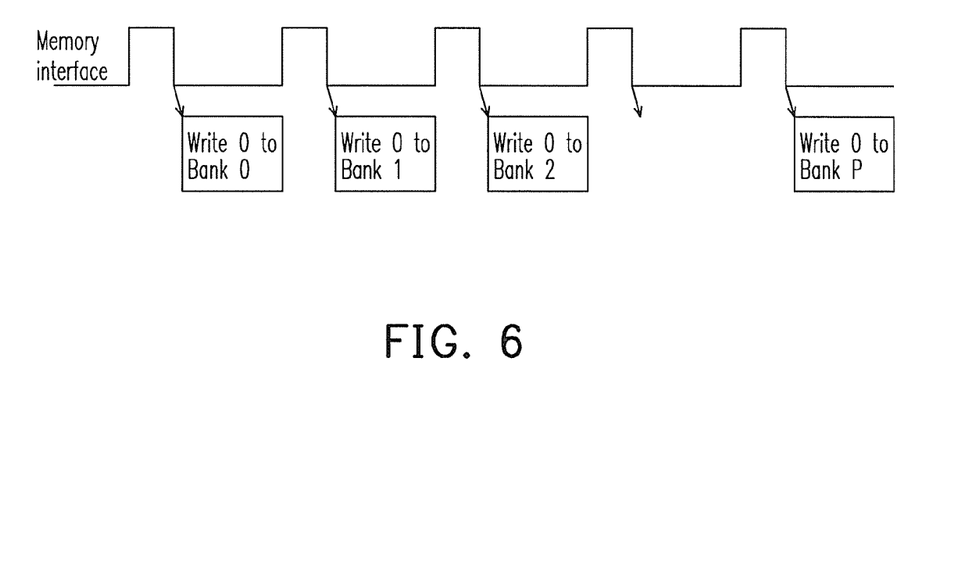
FIG. 6 is an example illustrating the cleaning of a bank data according to an embodiment of the invention.

First, the controller 50 transmits a clean command to the clean instruction 442, so as to control the clean instruction 442 to clean the touch data in all of the banks 462 of the storage module 46 (Step S502). For instance, FIG. 6 is an example illustrating the cleaning of bank data according to an embodiment of the invention. With reference to FIG. 6, after receiving the clean command, the clean instruction 442 generates a memory access interface and respectively writes a logic 0 to bank 0-bank P, so as to clean the touch data in the banks, for example.

After transmitting the clean command, the controller 50 checks the flag of the clean instruction 442, for example, so as to verify that the clean instruction 442 has completed the cleaning function (Step S504). After verifying the completion of the cleaning function, the controller 50 then transmits a scan command to the scan instruction 441, so as to control the scan instruction 441 to generate a sensing interface for receiving the touch data of the capacitive touch screen 52 from the touch detecting circuit 42 and generate a memory access interface for filling the touch data of different touch frames into the banks of the storage module 46 (Step S506). Specifically, after receiving the scan command, the scan instruction 441, for example, generates the related memory access interface, driving interface, and sensing interface. The number of banks 462 scanned by the scan instruction 441 may be set by the programmer, such as set to a single bank 462 or a plurality of banks 462. A sensing voltages detected on the capacitive touch screen 52 by the touch detecting circuit 42 are, for example, converted by the ADC into digital touch values and the digital touch value may be written into one or a plurality of corresponding banks 462 in the storage module 46 by the memory access interface.

Figure 7:
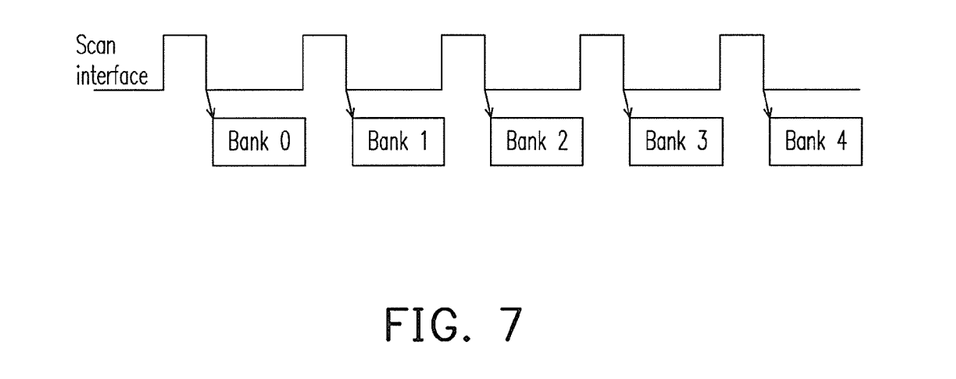
FIG. 7 is an example illustrating the recording of a touch data according to an embodiment of the invention.

For instance, FIG. 7 is an example illustrating the recording of a touch data according to an embodiment of the invention. Referring to FIG. 7, after receiving the scan command, the scan instruction 441 generates a scan interface, for example, so as to respectively write the touch data obtained from scanning to bank 0~4.

After transmitting the scan command, the controller 50 checks the flag of the scan instruction 441 in order to verify that the scan instruction 441 has completed the scan function, for example (Step S508). After verifying the completion of the scan function, the controller 50 then sequentially transmits computing commands to the multiplier instruction 443, the digital filter instruction 444, the adder instruction 445, or the max/min detecting instruction 446, so as to call these instructions to execute the corresponding touch computing functions (Step S510).

To be specific, the controller 50 transmits a multiply command to the multiplier instruction 443, for example, so as to control the multiplier instruction 443 to access the touch data in the banks 462 of the storage module 46, execute the multiply operation on the accessed touch data, and then record the touch data in the banks 462 of the storage module 46 after the multiply operation is completed. For example, the multiplier instruction 443 executes the computation of the following equation on the accessed touch data in the banks 462:

$$Out(x,y)=Offset+In(x,y)\times(M+N/P)$$

, in which M and N are preset parameters, P is a power of 2 (e.g. 1024 or 2048), and Offset is a shift quantity. After inputting a data In(x,y) in the equation above, an output data Out(x,y) is obtained. The equation described above is a typical formula for computing the touch coordinates, and by performing suitable computations on the touch data in the banks 462, a preferable touch dynamic range can be obtained. After the multiplier instruction 443 completes the multiply operation, the output data obtained from the computation is then stored in another bank 462 designated beforehand in the storage module 46.

The controller 50 transmits a digital filter command to the digital filter instruction 444, for example, so as to control the digital filter instruction 444 to access the touch data in the banks 462 of the storage module 46, execute the digital filtering operation on the accessed touch data, and then record the touch data after the digital filtering operation in another bank 462 designated beforehand in the storage module 46. Accordingly, by adopting the framework of the touch hard instructions in the present embodiment, the hardware version of the digital filter can be easily updated and used.

The controller 50 transmits an adder command to the adder instruction 445, for example, so as to control the adder instruction 445 to access the touch data of at least two banks 462 in the storage module 46, execute the adder operation on the accessed touch data, and then record the touch data in another bank 462 of the storage module 46 after the adder operation.

The controller 50 transmits a max/min detecting command to the max/min detecting instruction 446, for example, so as to control the max/min detecting instruction 446 to access the touch data of at least two banks 462 in the storage module 46, detect the maxima/minima in the touch data, and then record the detected maxima/minima in another bank 462 of the storage module 46.

For example, when the accessed touch data are input bank 1 and input bank 2, then a touch data (i.e. output bank) after being computed by the max/min detecting instruction 446 is for instance:

output bank=min(input bank1, input bank2) or output bank=max(input bank1, input bank2)

When the accessed touch data are input banks 1~3, then the touch data (i.e. output bank) after being computed by the max/min detecting instruction 446 is for instance:

output bank=min[abs(input bank1-input bank3), abs (input bank2-input bank 3)]

In view of the foregoing, in the control system and method for the capacitive touch screen according to embodiments of the invention, a plurality of instructions capable of executing different touch computing functions are designed and provided for call by the controller, thereby increasing the flexibility of the data flow. By adopting the system framework in the embodiments, not only the report rate and the power consumption are improved, but also the flexibility in computation by the MCU is preserved. Accordingly, the issues found in the conventional techniques adopting exclusive hardware for computing the touch coordinates, such as the fixed touch computation equations, or the fixed data flow in the computations which result in insufficient flexibility, are alleviated.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A control system for a capacitive touch screen, comprising:
    a touch detecting circuit, for detecting a capacitance variance of the capacitive touch screen to generate a touch data;
    a plurality of touch hard instruction circuits, for respectively executing a touch computing function on the touch data correspondingly;
    a storage module, connected to the touch detecting circuit and the plurality of touch hard instruction circuits, for recording the touch data generated by the touch detecting circuit and the touch data computed by the plurality of touch hard instruction circuits, wherein the storage module is divided into a plurality of banks using a touch frame as a unit, so as to respectively record the touch data of the touch frame; and
    a controller, connected to the touch detecting circuit, the plurality of touch hard instruction circuits, and the storage module, for assigning at least one touch task of a touch algorithm to the plurality of touch hard instruction circuits, so as to execute a touch computing function of the touch algorithm correspondingly, wherein the touch detecting circuit, the plurality of touch hard instruction circuits, the controller, and the storage module are connected by a memory arbiter.

2. The control system for the capacitive touch screen as claimed in claim 1, wherein the touch detecting circuit converts the capacitance variance into a plurality of touch values in a touch frame to serve as the touch data.

3. The control system for the capacitive touch screen as claimed in claim 1, wherein the controller transmits a touch computing command to each of the plurality of touch hard instruction circuits for calling the corresponding touch computing function executed by the touch computing command.

4. The control system for the capacitive touch screen as claimed in claim 3, wherein the controller determines whether the touch hard instruction circuit has completed the touch computing function by checking a flag from the touch hard instruction circuit, or by receiving a controller interrupt triggered by the touch hard instruction circuit.

5. The control system for the capacitive touch screen as claimed in claim 3, wherein when receiving the computing command, each of the plurality of touch hard instruction circuits generates a memory access interface to access the touch data recorded in the storage module.

6. The control system for the capacitive touch screen as claimed in claim 1, wherein the plurality of touch hard instruction circuits comprise:
    a scan instruction circuit connected to the touch detecting circuit, the scan instruction circuit generating a driving interface to drive the touch detecting circuit, a sensing interface to receive the touch data from the touch detecting circuit, and a memory access interface to fill the touch data of the touch frame into the corresponding banks of the storage module.

7. The control system for the capacitive touch screen as claimed in claim 1, wherein the plurality of touch hard instruction circuits comprise:
a clean instruction circuit, configured to clean the touch data in the banks of the storage module.

8. The control system for the capacitive touch screen as claimed in claim 1, wherein the plurality of touch hard instruction circuits comprise:
a multiplier instruction circuit, configured to access the touch data in the banks of the storage module, execute a multiply operation on the touch data, and record the touch data after the multiply operation in the banks of the storage module.

9. The control system for the capacitive touch screen as claimed in claim 1, wherein the plurality of touch hard instruction circuits comprise:
a digital filter instruction circuit, configured to access the touch data in the banks of the storage module, execute a digital filtering operation on the touch data, and record the touch data after the digital filtering operation in the banks of the storage module.

10. The control system for the capacitive touch screen as claimed in claim 1, wherein the plurality of touch hard instruction circuits comprise:
an adder instruction circuit, configured to access the touch data in at least two banks of the storage module, execute an adder operation on the touch data, and record the touch data in another bank of the storage module after the adder operation.

11. The control system for the capacitive touch screen as claimed in claim 1, wherein the plurality of touch hard instruction circuits comprise:
a max/min instruction circuit, configured to access the touch data in at least two banks of the storage module, detect a plurality of maxima/minima in the touch data, and record the maxima/minima in another bank of the storage module.

12. A control method for a capacitive touch screen, adapted for a controller executing at least one touch computing function on a touch data of the capacitive touch screen through a plurality of touch hard instructions, wherein a touch detecting circuit, the plurality of touch hard instructions, the controller, and a storage module are connected by a memory arbiter, and the touch detecting circuit detects a capacitance variance of the capacitive touch screen to generate the touch data, the control method comprising:
(A) assigning at least one touch task of a touch algorithm to the plurality of touch hard instruction circuits by the controller;
(B) transmitting a computing command to each of the plurality of touch hard instruction circuits for calling the touch hard instruction to execute the assigned touch computing function; and
(C) checking a flag in each of the plurality of touch hard instruction circuits in order to verify whether the touch hard instruction has completed the touch computing function.

13. The control method of the capacitive touch screen as claimed in claim 12, further comprising:
recording the touch data of the capacitive touch screen and the touch data computed by the plurality of touch hard instruction circuits into a plurality of banks in the storage module, wherein the banks are divided by using a touch frame as a unit.

14. The control method of the capacitive touch screen as claimed in claim 13, wherein the step (B) further comprises:
transmitting a clean command to a clean instruction circuit in the plurality of touch hard instruction circuits, for controlling the clean instruction circuit to clean the touch data in the banks of the storage module.

15. The control method of the capacitive touch screen as claimed in claim 13, wherein the step (B) further comprises:
transmitting a scan command to a scan instruction circuit in the plurality of touch hard instruction circuits, for controlling the scan instruction circuit to generate a sensing interface to receive the touch data of the touch capacitive screen, and to generate a memory access interface to fill the touch data of different touch frames into the banks of the storage module.

16. The control method of the capacitive touch screen as claimed in claim 13, wherein the step (B) further comprises:
transmitting a multiply command to a multiplier instruction circuit in the plurality of touch hard instruction circuits, for controlling the multiplier instruction circuit to access the touch data in the banks of the storage module, execute a multiply operation on the touch data, and record the touch data after the multiply operation in the banks of the storage module.

17. The control method of the capacitive touch screen as claimed in claim 13, wherein the step (B) further comprises:
transmitting a digital filter command to a digital filter instruction circuit in the at least one touch hard instruction, for controlling the digital filter instruction circuit to access the touch data in the banks of the storage module, execute a digital filtering operation on the touch data, and record the touch data in the banks of the storage module after the digital filtering operation.

18. The control method of the capacitive touch screen as claimed in claim 13, wherein the step (B) further comprises:
transmitting an adder command to an adder instruction circuit in the at least one touch hard instruction, for controlling the adder instruction circuit to access the touch data in at least two banks of the storage module, execute an adder operation on the touch data, and record the touch data in another bank of the storage module after the adder operation.

19. The control method of the capacitive touch screen as claimed in claim 13, wherein the step (B) further comprises:
transmitting a max/min detecting command to a max/min detecting instruction circuit in the at least one touch hard instruction, for controlling the max/min detecting instruction circuit to access the touch data in at least two banks of the storage module, detect a plurality of maxima/minima in the touch data, and record the maxima/minima in another bank of the storage module.

* * * * *